(12) United States Patent
Marolia et al.

(10) Patent No.: US 7,752,616 B2
(45) Date of Patent: *Jul. 6, 2010

(54) UPDATE SYSTEM CAPABLE OF UPDATING SOFTWARE

(75) Inventors: Sunil Marolia, Laguna Niguel, CA (US); Jason David Penkethman, Aliso Viejo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

This patent is subject to a terminal disclaimer.

(21) Appl. No.: 11/189,344

(22) Filed: Jul. 26, 2005

(65) Prior Publication Data

US 2005/0268296 A1    Dec. 1, 2005

Related U.S. Application Data

(63) Continuation of application No. PCT/US01/44034, filed on Nov. 19, 2001.

(60) Provisional application No. 60/249,606, filed on Nov. 17, 2000.

(51) Int. Cl.
*G06F 9/44* (2006.01)
*G06F 9/445* (2006.01)
*G06F 15/177* (2006.01)

(52) U.S. Cl. .................. 717/169; 717/172; 717/177; 709/220

(58) Field of Classification Search ......... 717/168–178; 455/418–420; 709/220–222; 713/1–2
See application file for complete search history.

(56) References Cited

U.S. PATENT DOCUMENTS

| 5,822,692 | A | * | 10/1998 | Krishan et al. | 455/419 |
|---|---|---|---|---|---|
| 5,838,981 | A | * | 11/1998 | Gotoh | 717/168 |
| 5,960,445 | A | * | 9/1999 | Tamori et al. | 707/203 |
| 6,031,830 | A | * | 2/2000 | Cowan | 370/338 |
| 6,820,259 | B1 | * | 11/2004 | Kawamata et al. | 717/173 |
| 6,941,453 | B2 | * | 9/2005 | Rao | 717/168 |
| 7,080,371 | B1 | * | 7/2006 | Arnaiz et al. | 717/170 |
| 7,120,909 | B1 | * | 10/2006 | Shibuya | 717/172 |
| 7,146,609 | B2 | * | 12/2006 | Thurston et al. | 717/169 |
| 2002/0184619 | A1 | * | 12/2002 | Meyerson | 717/173 |
| 2003/0033525 | A1 | * | 2/2003 | Rajaram | 713/168 |
| 2004/0215755 | A1 | * | 10/2004 | O'Neill | 709/223 |
| 2006/0248172 | A1 | * | 11/2006 | Zurawka et al. | 709/220 |

* cited by examiner

*Primary Examiner*—Wei Y Zhen
*Assistant Examiner*—Ryan D Coyer

(57) ABSTRACT

An electronic device with a handoff agent is capable of coordinating the update by one or more update agents in the electronic device. The handoff agent is capable of selectively updating an application software or firmware that is stored in non-volatile memory that may employ multiple FLASH chips, the handoff agent employing appropriate update agents, that each employs appropriate subsets of an update package that has been retrieved from an external system.

6 Claims, 2 Drawing Sheets

UPDATE SYSTEM CAPABLE OF UPDATING SOFTWARE

RELATED APPLICATIONS

The present application makes reference to, claims priority to, and claims benefit of U.S. Provisional Patent Application Ser. No. 60/600,323, entitled "UPDATE SYSTEM CAPABLE OF UPDATING SOFTWARE", filed 09 Aug. 2004, the complete subject matter of which is hereby incorporated herein by reference, in its entirety.

The present application makes reference to PCT Application with publication number WO/02/41147 Al, PCT number PCT/US01/44034, filed 19 Nov. 2001, which in turn is based on U.S. Provisional Patent Application Ser. No. 60/249,606 filed 17, Nov. 2000, both of which are incorporated by reference in their entirety. The present application also makes reference to U.S. patent application Ser. No. 10/761,735, filed Jan. 20, 2004, which is hereby incorporated by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. The software and firmware in electronic devices have bugs, and quite often, these bugs inhibit proper operation of the electronic device by a user.

Electronic devices, such as mobile phones and personal digital assistants (PDA's), often contain firmware and application software that are either provided by the manufacturers of the electronic devices, by telecommunication carriers, or by third parties. If firmware or firmware components are to be changed in electronic devices, it is often very tricky to update the firmware components. Particularly, any code of functions that is employed to update firmware or firmware components themselves may have to be changed or updated. Such code or functions, when upgraded, may not fit into the space available in the electronic device (FLASH or other storage). Changes to firmware or firmware components must be performed in a fault tolerant mode and fault tolerant code are not easy to implement.

Electronic devices such as mobile handsets often employ non-volatile memory, such as FLASH, to save code and data. Sometimes, more than one FLASH chips are employed. Updating code or data that reside across multiple FLASH chips is not easy, especially, if the chips are made by different manufacturers. For example, the architecture of the FLASH chips is often not known. Writing across multiple FLASH chips that are paired often requires knowledge of the FLASH architecture, which is known only to the manufacturers. Updating code resident in such FLASH architectures is therefore not a trivial task. This problem is exacerbated when a multi-processor system is employed in the electronic device. Structuring update packages to contain update instructions for multiple chips, or multiple agents is complicated.

Often, some component in the electronic device has an embedded FLASH segment, which is not accessible from external system. Updating the code in such FLASH segments is not easy. Some electronic devices have components or files in an OS layer that need to be updated simultaneously whenever an associated firmware component is changed. Changing one and not the other is a problem. However, it is usually not possible to figure out what needs to be changed first, and if the system is likely t be operative when one of them is changed and the other is to be updated next.

Support for updating components with dependencies in tandem is often lacking. In addition, an update agent is often not capable of updating a firmware as well as a file system component.

When a device management (DM) server, such as those in an operator network, needs to conduct a management task on a device, often the device may not be aware of that need. The DM server may not have the means to let the device know that it has to be managed. Informing a device that it needs to be managed, such as by changing a configuration or updating a firmware component, is a big problem. In addition, informing the device that the user needs to opt-in is another problem that needs to be solved. Providing relevant information to a user to educate the user on the need to conduct a DM activity is another problem that must be solved. Again, a DM server needs to be able to interact with several different device of different make and model. Often, it is not good to have a different solution for each make and model of a device. However, each device behaves differently and trying to support different user interface features in different devices is not a trivial task.

If firmware or firmware components are to be changed, it is often very tricky to update the firmware components in an electronic device. The electronic device must have sufficient memory available to download an update package and to execute an update process. Changes to firmware or firmware components of the electronic device must be performed in a fault tolerant mode and fault tolerant code are not easy to implement. Typically, changing or updating a firmware of a device is mush more complicated than a typically software installation. Any failure to properly conduct the update results in the device becoming inoperable.

Typically, attempts to upgrade firmware and/or software in electronic devices, such as GSM mobile phones, are often hampered by the need to have an embedded program that can conduct the update. Devices do not have the same user interface features and seeking user opt-in for firmware updates from users of several different types of devices is a complicated task, requiring device specific knowledge on the server side.

Addressing firmware updates across various types of make and model of electronic devices is a big challenge and is currently not easily solved. In addition, some electronic devices may not have sufficient memory to store a large update package or to conduct updates. Seeking a user opt-in for conducting firmware updates is likely to be confusing to the user if the firmware update operation is not likely to succeed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware and/or software update using an update agent(s) in a mobile electronic device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of conducting device management tasks, such as updating software/firmware in electronic devices, and more specifically, to the use of one or more update agents to update firmware, operating system (OS) and software in one or more FLASH chips in an electronic device, such as a mobile handset. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

Figure 1:
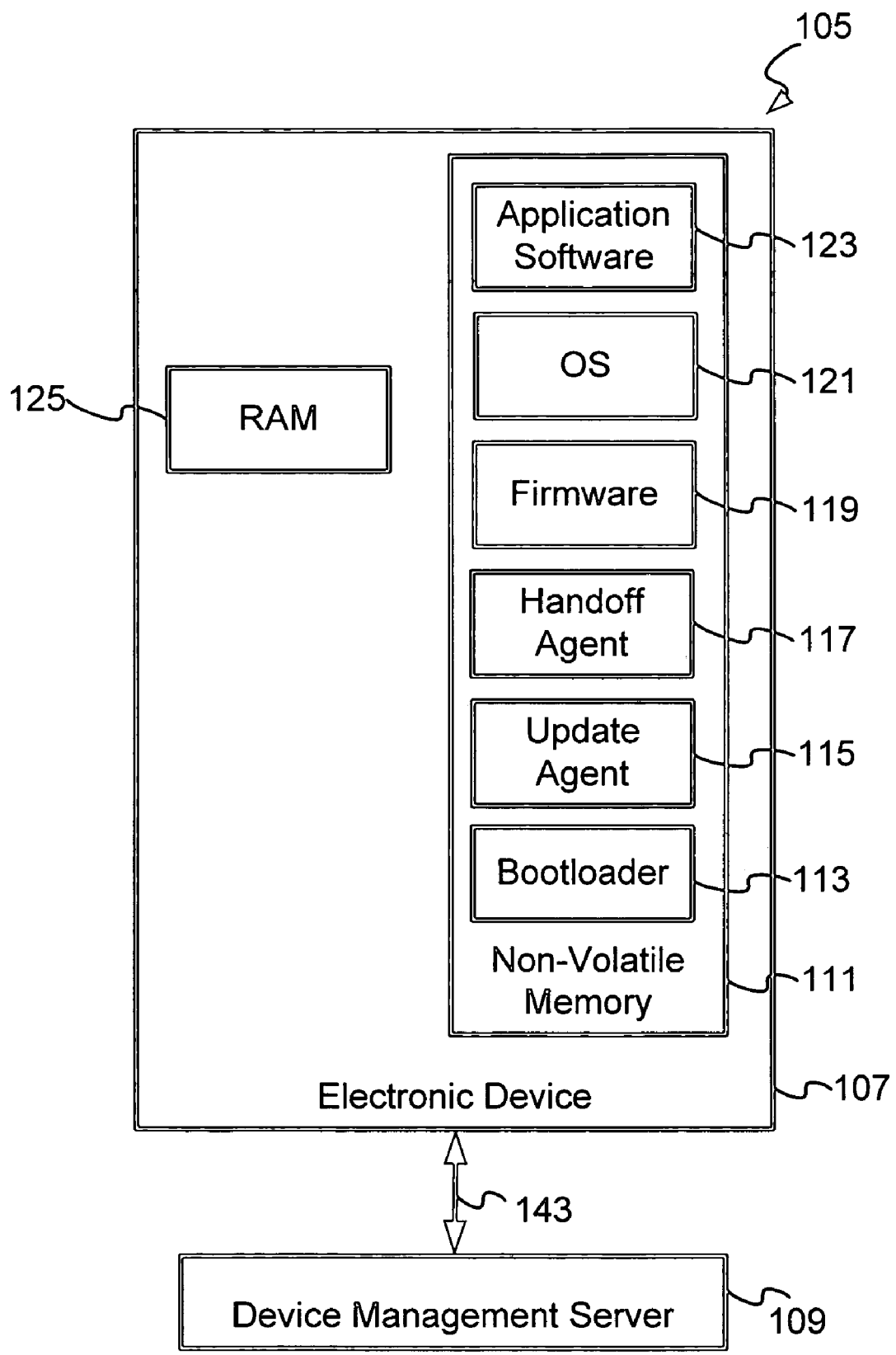
FIG. 1 is perspective block diagram of an update system capable of updating software that supports the update of an application software, an operating system (OS), or a firmware in an electronic device employing an update package provided by a management server, the electronic device being capable of applying updates using one or more update agents that are each capable of processing update packages or subsets thereof.

FIG. 1 is perspective block diagram of an update system capable of updating software that supports the update of an application software 123, an operating system (OS) 121, or a firmware 119 in an electronic device 107 employing an update package provided by a device management server 109, the electronic device 107 being capable of applying updates using one or more update agents 115 that are each capable of processing update packages or subsets thereof. The electronic device 107 comprises a non-volatile memory 111, a RAM 125, and other components such as processors, display etc. The non-volatile memory 111 comprises the update agent(s) 115 capable of updating the firmware 119, the operating system 121, the application software 123, etc. all typically resident in the non-volatile memory 111. A handoff agent 117 resident in the electronic device 107 makes it possible to specify to the update agent(s) 115 where an update package is located, and how it can be accessed and verified. It also coordinates gathering of results, result codes, status information, etc. from one or more update agents 115 after they have each updated at least a portion of the firmware, OS or software of the electronic device 107. The update agent 115 employs a flash library that makes it possible to interact with one or more FLASH chips that make up the non-volatile memory 111. In one embodiment, optionally, the update agent 115 employs a flash manager to access contents stored in non-volatile memory 111.

In one embodiment, the handoff agent 117 determines that an update package downloaded from a device management server 109 or from another delivery server (not shown) is comprised of multiple update information bundles that needs to be executed in a sequence, and it invokes a specific update agent 115 for each of the update information bundles, gathers result codes and status information from the update agent 115 after each of the update information bundles are executed or consumed, and returns the resultant result code and status information, such as to a device management client in the electronic device 107. Each of the update information bundles are individuals executed and the handoff agent determines the need to reset or reboot the electronic device 107 after the update by the associated update agent 115.

In one embodiment, the handoff agent 117 determines that an update package downloaded from a device management server 109 or from another delivery server (not shown) is comprised of multiple update information bundles that can be executed or consumed in parallel, and dispatches them to the associated update agent 115 instances. It also manages the subsequent gathering of result codes and status information and their communication to an application, such as a device management client in the electronic device 107.

In one embodiment, the handoff agent 117 determines that an update package downloaded from a device management server 109 or from another delivery server (not shown) is comprised of multiple update information bundles and the handoff agent determines that at least one of the update information bundles is to be executed by an update agent 115 at the firmware level and at least another of the update information bundles is to be executed by an update agent 115 at the OS level, and invokes both of them in the appropriate order, taking care to reset the electronic device 107, as necessary, such as after the update at the firmware level. The handoff agent 117 collects result codes and status information from the update agents from the OS level as well as the update agents at the firmware level, collates all the collected information, and reports it to the other applications that have a need to know, such as a device management client that manages firmware and software updates in the electronic device 107.

In one embodiment, the handoff agent 117 verifies the update package received by computing and comparing an MD5 checksum, a message authentication code, etc., and subsequently parses the update package received to determine if one or more update agents need to be involved in updating the device based on the update package received from an external system, such as from the device management server 109.

In general, the electronic device 107 with the handoff agent 117 is capable of coordinating the update by one or more update agents 115 in the electronic device. The handoff agent 117 is capable of selectively updating an application software or firmware that is stored in non-volatile memory 111 that may employ multiple FLASH chips, the handoff agent 117 employing appropriate update agents 115, that each employs appropriate subsets of an update package that has been retrieved from an external system.

Figure 2:
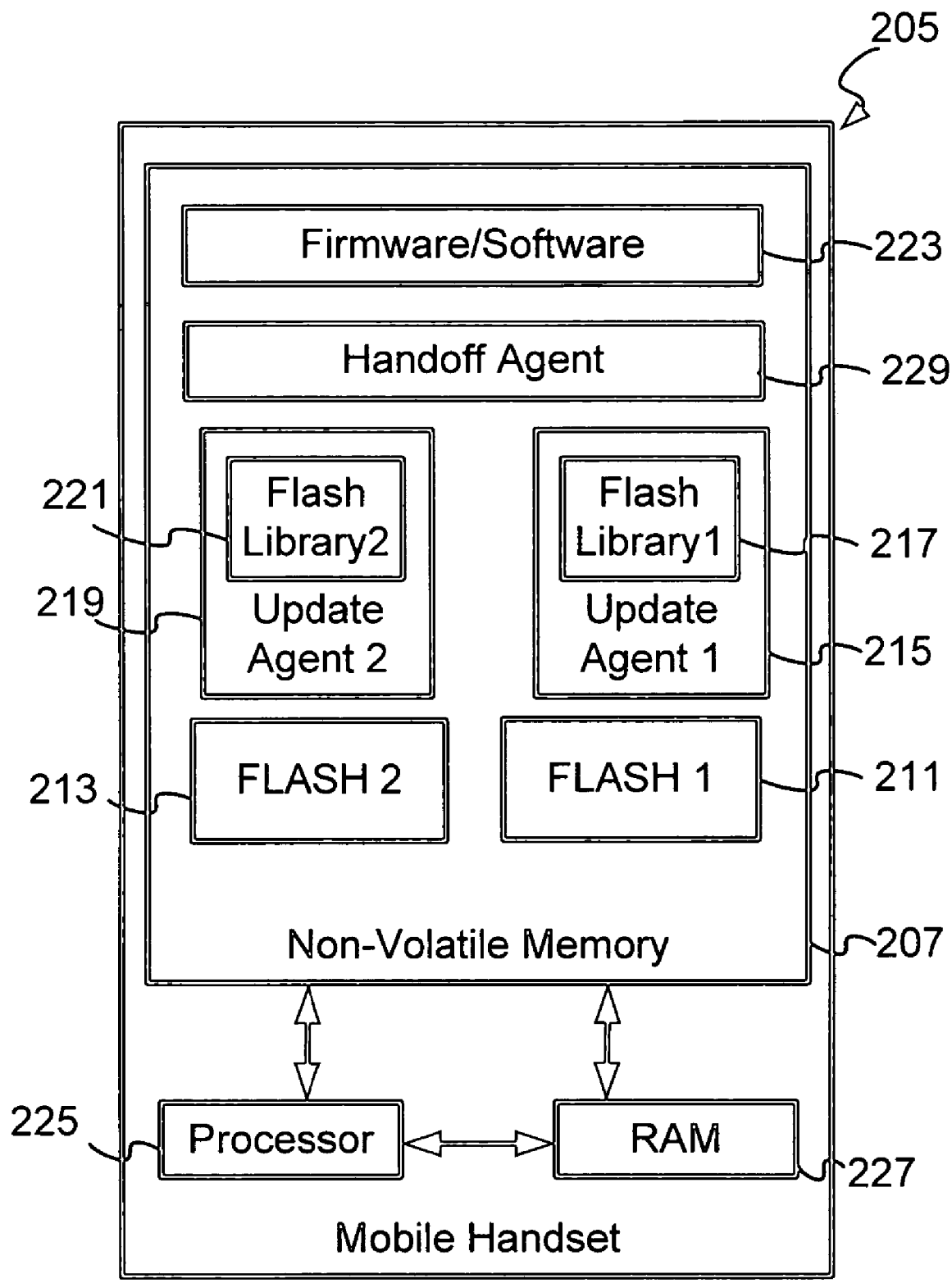
FIG. 2 is a perspective block diagram of a mobile handset the employs multiple FLASH chips for its non-volatile memory while employing multiple update agents, one for each flash chip, that are each capable of updating code or data resident in the associated one of the multiple FLASH chips.

FIG. 2 is a perspective block diagram of a mobile handset 205 the employs multiple FLASH chips for its non-volatile memory 207 while employing multiple update agents, one for each flash chip, that are each capable of updating code or data resident in the associated one of the multiple FLASH chips. The mobile handset 205 comprises two update agents 215, 219, one for each of the flash microchips 211 and 213, respectively that make up the non-volatile memory 207 of the mobile handset 205. It also comprises a RAM 227 and a processor 225. A handoff agent 229 coordinates the update of both the flash microchips, flash1 211 and flash2 213, employing appropriate subsets of an update package retrieved from an external system such as a delivery server or a device management server.

In one embodiment, the handoff agent verifies that an update package is appropriate for the mobile handset 205, employing checksums (CRC, MD5, etc.) or digital signatures (cryptographic means, or hashes), and then determines if the update package impacts one or both the flash microchips 211, 213. If it determines that some or all of the contents of both the flash microchips 211, 213 are to be updated, it coordinates the setup, invocation, optional reset and gathering of result codes and status information from the two update agents 215, 219. It also reports the result codes and status information via a call back function, such as a call back function provided by a device management client application, that is part of the firmware/software 223 in the mobile handset 205.

In general, the update agents 219, 215 employ a FLASH library 217, 221 that supports multiple FLASH chips from the same manufacturer or from different manufacturers.

In general, the electronic device 107 is capable of being updated and it comprises a firmware and a software, a non-volatile memory wherein the firmware 119 and the software 121, 123 is resident and a RAM wherein the firmware 119 and the software 123, 121 is optionally executed. In addition, it comprises at least one update agent resident in the non-volatile memory of the electronic device and a handoff agent resident in the non-volatile memory unit. The handoff agent 117 in the electronic device 107 coordinates the update of the non-volatile memory 111.

The handoff agent 117 specifies to the at least one update agent the location of an update package to be used to update the firmware and software. It also specifies to the at least one update agent the information needed to access and verify the update package. In addition, the handoff agent 117 selectively coordinates the update of the at least one update agent. The handoff agent selects one of the at least one update agent for updating the firmware 119 and the software 121, 123 of the mobile device 107.

In one embodiment, the handoff agent provides information to the at least one of the plurality of update agents on the location where results, result codes and status information may be stored after they have each updated at least a portion of the firmware, an operating system, or the software in the electronic device.

In another related embodiment, the electronic device comprises a plurality of update agents. The handoff agent selects one of the plurality of update agents to update the firmware, another one of the plurality of update agents to update the software and yet another one of the plurality of update agents to update the operating system. The update package used for the updates is retrieved from an external system and can be used to update the firmware, the operating system and the software. The handoff agent employs the plurality of update agents such that each of the plurality of update agents employs at least one appropriate subset of the update package.

In a related embodiment, the update package comprises a first subset and a second subset. The handoff agent employs one of the plurality of update agents to update the firmware using the first subset of the update package and another of the plurality of update agents to update the software and the operating system using the second subset of the update package.

In another related embodiment, the electronic device 205 also comprises a first flash unit 211 in the non-volatile memory 207 and a second flash unit 213 in the non-volatile memory 207. In addition, it comprises a first update agent 215 associated with the first flash unit 211 and capable of updating a first code resident in the first flash unit 211 and a second update agent 219 associated with the second flash unit 213 and capable of updating a second code resident in the second flash unit 213. The update package comprises a first subset associated with the first flash unit and a second subset associated with the second flash unit. The handoff agent 229 employs the first update agent 215 and the first subset to update the first code resident in the first flash unit 211 and the second update agent 219 and the second subset to update the second code resident in the second flash unit 213. In a related embodiment, the first code and the second code collectively comprise the firmware and the software 223.

Aspects of the present invention are also found in a mobile phone 107 capable of updating a firmware 119, an operating system 121 and a software 123 resident in the mobile phone 107. The mobile phone comprises a plurality of update agents 115 and a handoff agent 117. The handoff agent coordinates the update of the firmware 119, the operating system 121 and the software 123 of the mobile phone 107 by the plurality of update agents 115 in the mobile phone.

In a related embodiment, the electronic device 205 also comprises a non-volatile memory 207 wherein the firmware, the operating system and the software 223 are resident, the non-volatile memory 207 comprising a plurality of FLASH chips 211, 213. The electronic device also comprises an update package. The handoff agent 229 employing the appropriate ones of the plurality of update agents 215, 219, that each employ an appropriate subset of the update package to update at least one of the plurality of FLASH chips 211, 213. In a related embodiment, each of the plurality of FLASH chips 211, 213 require the use of an appropriate one of a plurality io libraries for reading and writing purposes. Each of the plurality of update agents 215, 219 employ an associated appropriate one of the plurality of io libraries for reading and writing purposes in the associated one of the plurality of FLASH chips 211, 213. The handoff agent makes it possible to specify to the plurality of update agents 215, 219 where the update package is located, and how it can be accessed and verified. The handoff agent 229 coordinates gathering of at least one of a results, a result codes, and a status information from at least one of the plurality of update agents 211, 213 after they have each updated at least a portion of the firmware, the operating system or the software 223. The handoff agent 229 verifies that an update package is appropriate for the mobile phone 205, employing at least one of a CRC checksum, an MD5 checksum, a digital signature, and a hash value.

In a related embodiment, the handoff agent 229 determines if the update package is applicable to one or more of the plurality of FLASH chips 211, 213 and coordinates the setup, invocation, optional reset and gathering of result codes and status information from the those of the plurality of update agents 215, 219 that it determines to be associated with the applicable ones of the plurality of FLASH chips 211, 213.

Aspects of the present invention can also be found in a method of updating a mobile phone 205 that comprises the plurality of FLASH chips 211, 213, the plurality of update agents 215, 219, and the handoff agent 229. The method comprises processing an update package to determine a target chip list comprising those of the plurality of FLASH chips 211, 213 that need to be updated using the update package, then invoking those of the plurality of update agents associated with the target chip list. It also comprises gathering a results, a result codes, and a status information from those of the plurality of update agents 215, 219 associated with the target chip list.

In a related methods, the process of invoking comprises specifying appropriate subsets of the update package for each of the those of the plurality of update agents 215, 219 associated with the target chip list and specifying a location of the update package, a location of the results, a location for the result codes, a location for the status information, and a location for s security information, for each of the those of the plurality of update agents 215, 219 associated with the target chip list. It also comprises triggering an update for each of the those of the plurality of update agents 215, 219 associated with the target chip list.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An electronic device configured to be updated, the electronic device comprising:
   firmware, an operating system, and application software;
   a non-volatile memory wherein the firmware, the operating system, and the application software are resident;
   a random-access memory (RAM) wherein the firmware, the operating system, and the application software are optionally executed;
   a plurality of update agents resident in the non-volatile memory of the electronic device, each update agent employing a library that enables the update agent to interact with a portion of the non-volatile memory to be updated; and
   a handoff agent resident in the non-volatile memory unit and configured to coordinate use of the plurality of update agents to perform updates of the non-volatile memory in the electronic device;
   wherein the handoff agent is configured using information contained in a received update package to specify to each update agent the location of a subset of the update package to be used by the update agent to update the firmware, the operating system, or the application software;
   wherein the handoff agent is configured using information contained in a received update package to specify to each update agent the information needed to access and verify the update package; and
   wherein the handoff agent is configured using information contained in a received update package to select one of the plurality of update agents to update the firmware, another one of the plurality of update agents to update the application software and yet another one of the plurality of update agents to update the operating system.

2. The electronic device of claim 1 further comprising:
   an update package that has been retrieved from an external system that is configured to be used to update the firmware, the operating system and the application software; and
   the handoff agent configured to employ the plurality of update agents such that each of the plurality of update agents employs at least one appropriate subset of the update package.

3. The electronic device of claim 2 further comprising:
   the update package comprising a first subset and a second subset; and
   the handoff agent configured to employ one of the plurality of update agents to update the firmware using the first subset of the update package and another of the plurality of update agents to update the application software and the operating system using the second subset of the update package.

4. An electronic device configured to be updated, the electronic device comprising:
   firmware, an operating system, and application software;
   a non-volatile memory wherein the firmware, the operating system, and the application software are resident;
   a random-access memory (RAM) wherein the firmware, the operating system, and the application software are optionally executed;
   a plurality of update agents resident in the non-volatile memory of the electronic device, each update agent employing a library that enables the update agent to interact with a portion of the non-volatile memory to be updated;
   a handoff agent resident in the non-volatile memory unit and configured to coordinate use of the plurality of update agents to perform updates of the non-volatile memory in the electronic device;
   a plurality of flash units resident in the non-volatile memory, wherein the firmware, the operating system, and the application software are contained such that code representing the firmware is resident a first flash unit, code representing the operating system is resident a second flash unit, and code representing the application software is resident a third flash unit;
   wherein each of the plurality of update agents is associated with a flash unit and configured to update code resident in the associated flash unit;
   an update package comprising a plurality of subsets wherein each subset is associated with a flash unit; and the handoff agent configured using information contained in the update package to specify to each update agent the location of a subset of the update package to be used by the update agent to update the firmware, the operating system, or the application software and configuring the handoff agent using information contained in the update package to employ a first update agent and a first subset to update the code resident in the first flash unit, a second update agent and a second subset to update the code resident in the second flash unit, and a third update agent and a third subset to update the code resident in the third flash unit.

5. A method of updating a mobile phone that comprises a plurality of FLASH chips, a plurality of update agents, and a handoff agent, the method comprising:

associating each of the plurality of update agents with at least one of the plurality of FLASH chips, wherein the plurality of update agents comprises a first update agent associated with a first FLASH chip and configured to update a first code resident in the first FLASH chip, a second update agent associated with a second FLASH chip and configured to update a second code resident in the second FLASH chip, and a third update agent associated with a third FLASH chip and configured to update a third code resident in the third FLASH chip, and wherein the plurality of FLASH chips comprise a non-volatile memory within which the firmware, the operating system, and the application software are contained such that code representing the firmware is resident on the first FLASH chip, code representing the operating system is resident on the second FLASH chip, and code representing the application software is resident on the third FLASH chip;

processing an update package to determine a target chip list comprising those of the plurality of FLASH chips that need to be updated using the update package, wherein the update package comprises a first subset associated with the first FLASH chip, a second subset associated with the second FLASH chip, and a third subset associated with the third FLASH chip;

configuring the handoff agent using information contained in the update package to specify to each update agent the location of a subset of the update package to be used by the update agent to update the firmware, the operating system, or the application software, and configuring the handoff agent using information contained in the update package to invoke those of the plurality of update agents associated with the target chip list, wherein the first update agent and the first subset are used to update the first code resident in the first FLASH chip, the second update agent and the second subset are used to update the second code resident in the second FLASH chip, and the third update agent ant the third subset are used to update the third code resident in the third FLASH chip; and gathering results, result codes, and status information from those of the plurality of update agents associated with the target chip list.

6. The method of updating a mobile phone according to claim 5 wherein invoking comprises:

specifying appropriate subsets of the update package for each of those of the plurality of update agents associated with the target chip list; specifying a location of the update package, a location of the results, a location for the result codes, a location for the status information, and a location for security information, for each of those of the plurality of update agents associated with the target chip list; and triggering an update for each of those of the plurality of update agents associated with the target chip list.

* * * * *

UNITED STATES PATENT AND TRADEMARK OFFICE
CERTIFICATE OF CORRECTION

PATENT NO.         : 7,752,616 B2                                                    Page 1 of 1
APPLICATION NO. : 11/189344
DATED                : July 6, 2010
INVENTOR(S)       : Sunil Marolia et al.

It is certified that error appears in the above-identified patent and that said Letters Patent is hereby corrected as shown below:

In column 10, line 18, in Claim 5, delete "ant" and insert -- and --, therefor.

Signed and Sealed this

Twelfth Day of October, 2010

David J. Kappos
*Director of the United States Patent and Trademark Office*